(12) United States Patent
Takayasu

(10) Patent No.: US 11,289,749 B2
(45) Date of Patent: Mar. 29, 2022

(54) BATTERY PACK, ELECTRONIC DEVICE, VEHICLE, POWER TOOL, AND POWER STORAGE SYSTEM

(71) Applicant: MURATA MANUFACTURING CO., LTD., Kyoto (JP)

(72) Inventor: Masao Takayasu, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 352 days.

(21) Appl. No.: 16/539,582

(22) Filed: Aug. 13, 2019

(65) Prior Publication Data

US 2019/0372182 A1 Dec. 5, 2019

Related U.S. Application Data

(63) Continuation of application No. PCT/JP2017/042205, filed on Nov. 24, 2017.

(30) Foreign Application Priority Data

Feb. 15, 2017 (JP) .............................. JP2017-026139

(51) Int. Cl.
*H01M 10/653* (2014.01)
*H01M 10/613* (2014.01)
*H01M 10/6235* (2014.01)
*H01M 10/625* (2014.01)
*H02J 7/00* (2006.01)
(Continued)

(52) U.S. Cl.
CPC ....... *H01M 10/653* (2015.04); *H01M 10/613* (2015.04); *H01M 10/625* (2015.04); *H01M 10/6235* (2015.04); *H01M 50/20* (2021.01);
*H01M 50/213* (2021.01); *H02J 7/0063* (2013.01); *B25F 5/006* (2013.01); *B60K 6/28* (2013.01); *B60L 50/64* (2019.02); *B60Y 2200/91* (2013.01); *B60Y 2200/92* (2013.01); *B60Y 2400/112* (2013.01)

(58) Field of Classification Search
None
See application file for complete search history.

(56) References Cited

U.S. PATENT DOCUMENTS

2005/0022966 A1 2/2005 Takahashi
2013/0082659 A1 4/2013 Kano
(Continued)

FOREIGN PATENT DOCUMENTS

CN 103117364 5/2013
CN 103201875 7/2013
(Continued)

OTHER PUBLICATIONS

Chinese Office Action dated Aug. 4, 2021 in corresponding Chinese Application No. 201780086465.5.
(Continued)

*Primary Examiner* — Carmen V Lyles-Irving
(74) *Attorney, Agent, or Firm* — K&L Gates LLP

(57) ABSTRACT

A battery pack having thermal diffusivity and anti-vibration property is provided. The battery pack includes a plurality of batteries and a battery holder having a plurality of battery housing portions configured to store the batteries, wherein the battery holder includes an elastic material having thermal conductivity. The elastic material includes rubber or a thermoplastic elastomer. The battery holder includes an electrically insulating material.

15 Claims, 11 Drawing Sheets

(51) Int. Cl.
*H01M 50/20* (2021.01)
*H01M 50/213* (2021.01)
*B60L 50/64* (2019.01)
*B25F 5/00* (2006.01)
*B60K 6/28* (2007.10)

(56) References Cited

U.S. PATENT DOCUMENTS

2013/0224539 A1 8/2013 Hayashi et al.
2017/0301964 A1 10/2017 Murakami et al.

FOREIGN PATENT DOCUMENTS

| CN | 204516814 | | 7/2015 |
|----|-----------|---|--------|
| JP | 2005056837 | A | 3/2005 |
| JP | 2006196277 | A | 7/2006 |
| JP | 2006310153 | A | 11/2006 |
| JP | 2012138267 | A | 7/2012 |
| JP | 2013073864 | A | 4/2013 |
| JP | 2015141890 | A | 8/2015 |
| WO | 2016/067517 | | 5/2016 |
| WO | 2016067517 | A1 | 5/2016 |

OTHER PUBLICATIONS

International Search Report for Application No. PCT/JP2017/042205, dated Feb. 20, 2018.

BATTERY PACK, ELECTRONIC DEVICE, VEHICLE, POWER TOOL, AND POWER STORAGE SYSTEM

CROSS REFERENCE TO RELATED APPLICATIONS

The present application is a continuation of PCT patent application no. PCT/JP2017/042205, filed on Nov. 24, 2017, which claims priority to Japanese patent application no. JP2017-026139 filed on Feb. 15, 2017, the entire contents of which are being incorporated herein by reference.

BACKGROUND

The present technology generally relates to a battery pack that is applicable to electronic devices, vehicles, power tools, power storage systems, and the like. More particularly, the present technology relates to a battery pack that includes a battery holder for storing a plurality of batteries.

In recent years, there is an increasing demand for battery packs containing lithium ion batteries and the like as a power source of hybrid devices that use an engine and a motor as drive sources and devices that use a motor as a drive source. The battery pack is formed by containing one or more battery blocks including, in an exterior case, a battery such as a lithium ion battery and a battery holder holding a plurality of the batteries. This battery pack can be used as a power source for various electric devices used outdoors such as electronic devices, electric assist bicycle, electric motorcycles, electric wheelchairs, electric tricycles, electric carts, and electric tools. At the same time, there is an increasing demand for high-power, long-life, battery packs available for use in environments of usage adequate for these purposes.

Under these circumstances, the battery pack is supposed to be used in a high-output system, and it is hence necessary to take measures against performance degradation of the battery due to heat generation from the battery. In particular, when a battery is placed near the center in the battery pack, the temperature is likely to rise with a high load applied, and heat may be accumulated. Furthermore, when this battery pack is applied to a vehicle or the like, vibration from the drive source such as an engine may be transmitted to the battery pack to cause performance degradation of the battery, and hence anti-vibration measures are required.

SUMMARY

The present technology generally relates to a battery pack that is applicable to electronic devices, vehicles, power tools, power storage systems, and the like. More particularly, the present technology relates to a battery pack that includes a battery holder for storing a plurality of batteries.

In the conventional technology, the battery packs have not had a sufficient thermal diffusivity and anti-vibration performance.

The present technology was made in view of such a situation, and its main objective is to provide a battery pack that has thermal diffusivity and anti-vibration property.

According to an embodiment of the present technology, a battery pack is provided. The battery pack includes a plurality of batteries and a battery holder having a plurality of battery housing portions configured to store the batteries, wherein the battery holder includes an elastic material having thermal conductivity. The elastic material includes rubber or a thermoplastic elastomer. The battery holder may include an electrically insulating material.

The present technology provides an electronic device that includes the battery pack according to an embodiment of the present technology as a power supply source. The present technology provides an electric vehicle that includes a battery pack according to an embodiment of the present technology, a converter configured to convert electric power supplied from the battery pack into a driving force, a driver configured to drive in response to the driving force, and a controller configured to control a usage state of the battery pack. The present technology provides a power tool that includes a battery pack according to an embodiment of the present technology and a movable portion to which electric power is configured to be supplied from the battery pack. In addition, the present technology provides a power storage system that includes a battery pack according to an embodiment of the present technology, one or more electric devices to which electric power is configured to be supplied from the battery pack, and a controller configured to control a power supply to the electric device from the battery pack.

According to the present technology, it is possible to provide a battery pack having thermal diffusivity and anti-vibration property.

It should be understood that the effects described here are not necessarily limited, and other suitable properties relating to the present technology may be realized and as further described.

BRIEF DESCRIPTION OF FIGURES

FIGS. 4(A) and 4(B) each are an enlarged perspective view showing a metal plate shown in FIG. 3, in which FIG. 4(A) is an enlarged perspective view showing the metal plate on which two terminal contact portions are formed, and FIG. 4(B) is an enlarged perspective view showing the metal plate on which four terminal contact portions are formed.

FIGS. 6(A) and 6(B) each are an enlarged sectional view showing a connection state of the battery and the metal plate shown in FIG. 3, in which FIG. 6(A) is an enlarged sectional view showing a state before connection, and FIG. 6(B) is an enlarged sectional view showing a state after connection.

DETAILED DESCRIPTION

As described herein, the present disclosure will be described based on examples with reference to the drawings, but the present disclosure is not to be considered limited to the examples, and various numerical values and materials in the examples are considered by way of example. The embodiments described below can be combined with any of the embodiments.

The description will be given in the following order.

A battery pack according to the first embodiment of the present technology will be described with reference to FIGS. 1 to 7. The battery pack is roughly divided into a battery block that works as a power source and an exterior case in which the battery block is contained. The battery block is composed of a plurality of batteries, a battery holder for holding these batteries, and a metal plate connected to terminals of the batteries. Each configuration will be described below.

Figure 1:
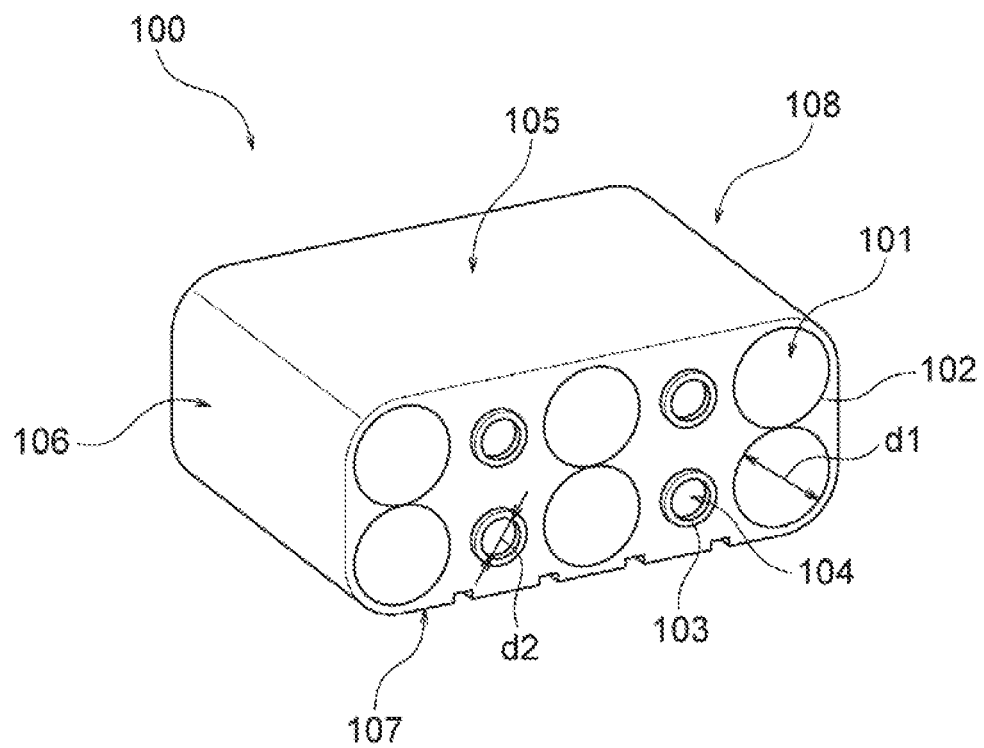
FIG. 1 is a perspective view showing a battery holder provided in a battery pack according to an embodiment of the present technology.

FIG. 1 is a perspective view showing the configuration of a battery holder 100 provided in the battery pack according to the first embodiment of the present technology. The battery holder 100 includes, on its side surface, a plurality of cylindrical battery housing portions 102 having insertion holes 101 into which the batteries are inserted from the positive electrode side and a circumferential rib 103 that is formed on the surface opposite to the surface on which the insertion holes 101 are formed. At a central portion of the circumferential rib 103, a rib hole 104 to which the positive electrode terminal of the battery contained in the battery housing portion 102 can be exposed is formed. A diameter d1 of the insertion hole 101 may be larger than a diameter of a bottom circle of the battery contained in the battery housing portion 102. A diameter d2 of the rib hole 104 may be a size that allows the positive electrode terminal of the battery contained in the battery housing portion 102 to be exposed, and is formed smaller than the diameter d1 of the insertion hole 101. Here, the diameter d2 is preferably smaller than the diameter of the bottom circle of the battery contained in the battery housing portion 102. As one example, the diameter d2 is preferably 6.6 to 6.8 mm when the diameter of the bottom circle of the battery contained in the battery housing portion 102 is 18 mm.

In the battery holder 100, as an example, ten of the hollow cylindrical battery storage portions 102 are formed at predetermined intervals. The battery housing portion 102 has the insertion hole 101 opened at one end side, and one battery can be inserted through the opening. On the other hand, for example, a substantially circular rib hole 104 is formed on the other end side of the battery housing portion 102, and the electrode of each battery is exposed from the battery holder 100 when the battery is inserted. In the battery holder 100 of the present embodiment, the battery storage portions 102 are arrayed, as an example, in two rows and five columns, and adjacent batteries contained in the same row can be arranged to alternate the orientations of the positive electrode surface and the negative electrode surface. In each of the battery holders 100, the battery housing portions 102 are provided at predetermined intervals one another, and the contained batteries can be insulated from one another. In the battery holder 100, an upper surface portion 105, a side surface portion 106 on one side, a bottom surface portion 107, and a side surface portion 108 on the other side are continuously formed so as to surround the plurality of battery storage portions 102. Thus, the battery holder 100 has a curved peripheral surface. While ten of the cylindrical battery housing portions 102 are formed in the battery holder 100 of the present embodiment, the shape and number of the battery housing portions 102 are not limited thereto. Furthermore, in the present embodiment, the battery is inserted into the insertion hole 101 of the battery housing portion 102 from the positive electrode side, but the direction of insertion of the battery is not limited thereto. The battery may be inserted into the insertion hole 101 from the negative electrode side and the negative electrode terminal of the battery may be exposed from the rib hole 104. In this case, the diameter d2 of the rib hole 104 may have a size that allows the negative electrode terminal of the battery contained in the battery housing portion 102 to be exposed.

The battery holder 100 is formed of a material that includes an elastic material having thermal conductivity. As the elastic material, for example, synthetic rubber such as silicone rubber, ethylene propylene rubber (EPDM), and fluororubber (FKM), which have electrical insulation, or thermoplastic elastomer resin can be used. In this manner, use of silicone rubber having high thermal conductivity for the battery holder 100 causes heat generation of the battery to be efficiently transferred and diffused, thereby allowing a rapid temperature rise of the battery and temperature variations in the plurality of batteries to be reduced. Furthermore, since silicone rubber also has electrical insulation, a plurality of batteries can be arranged in the battery holder 100 to alternate the positive electrode side and the negative electrode side, thereby allowing the battery block to be made compact. Use of the thermoplastic elastomer resin can boost the degree of freedom in shape because injection molding (two-shot molding) becomes possible in addition to the same effect as in the case of use of silicone rubber. In the present embodiment, as an example, compared with thermal countermeasures by potting material or the like, use of silicone rubber (density: 1.9 g/cm$^3$) having high thermal conductivity as the material of the battery holder 100 allows the entire weight of the battery pack to be reduced, the manufacturing takt time to be shortened, and the manufacturing cost to be reduced.

Figure 2:
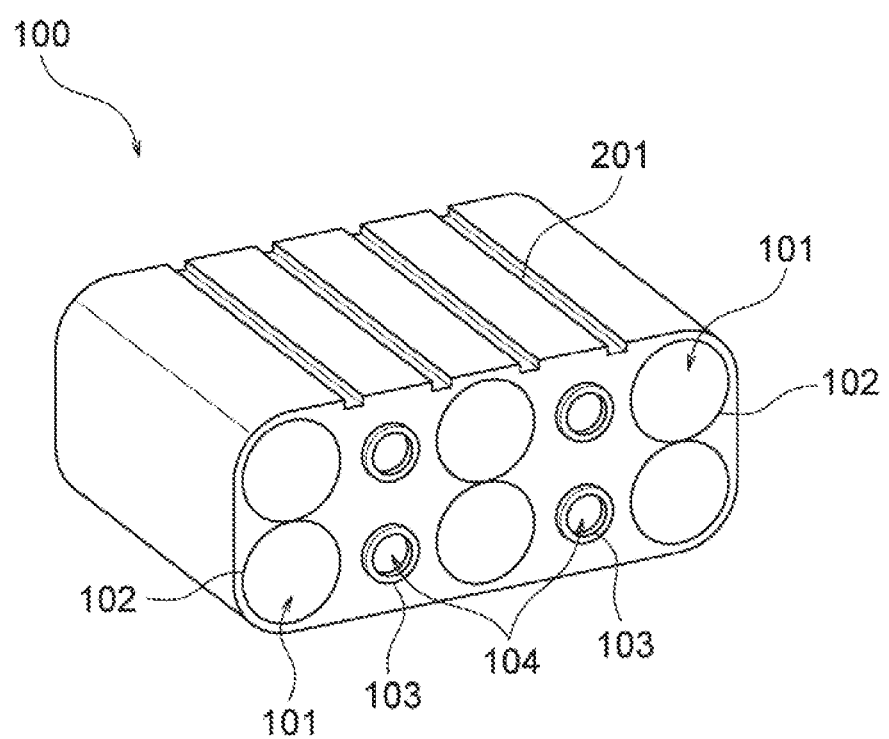
FIG. 2 is a bottom perspective view of the battery holder shown in FIG. 1.

FIG. 2 is a bottom perspective view of the battery holder 100. On the bottom surface portion 107 of the battery holder 100, a plurality of holder grooves 201 extending in a direction in which the battery is housed are formed at predetermined intervals. When a liquid enters the battery pack, the holder groove 201 can guide the liquid to a drainage portion and prevent the liquid from entering the battery holder 100. In the present embodiment, as an example, the holder groove 201 is formed to be 2 mm wide and 1 mm deep.

Figure 3:
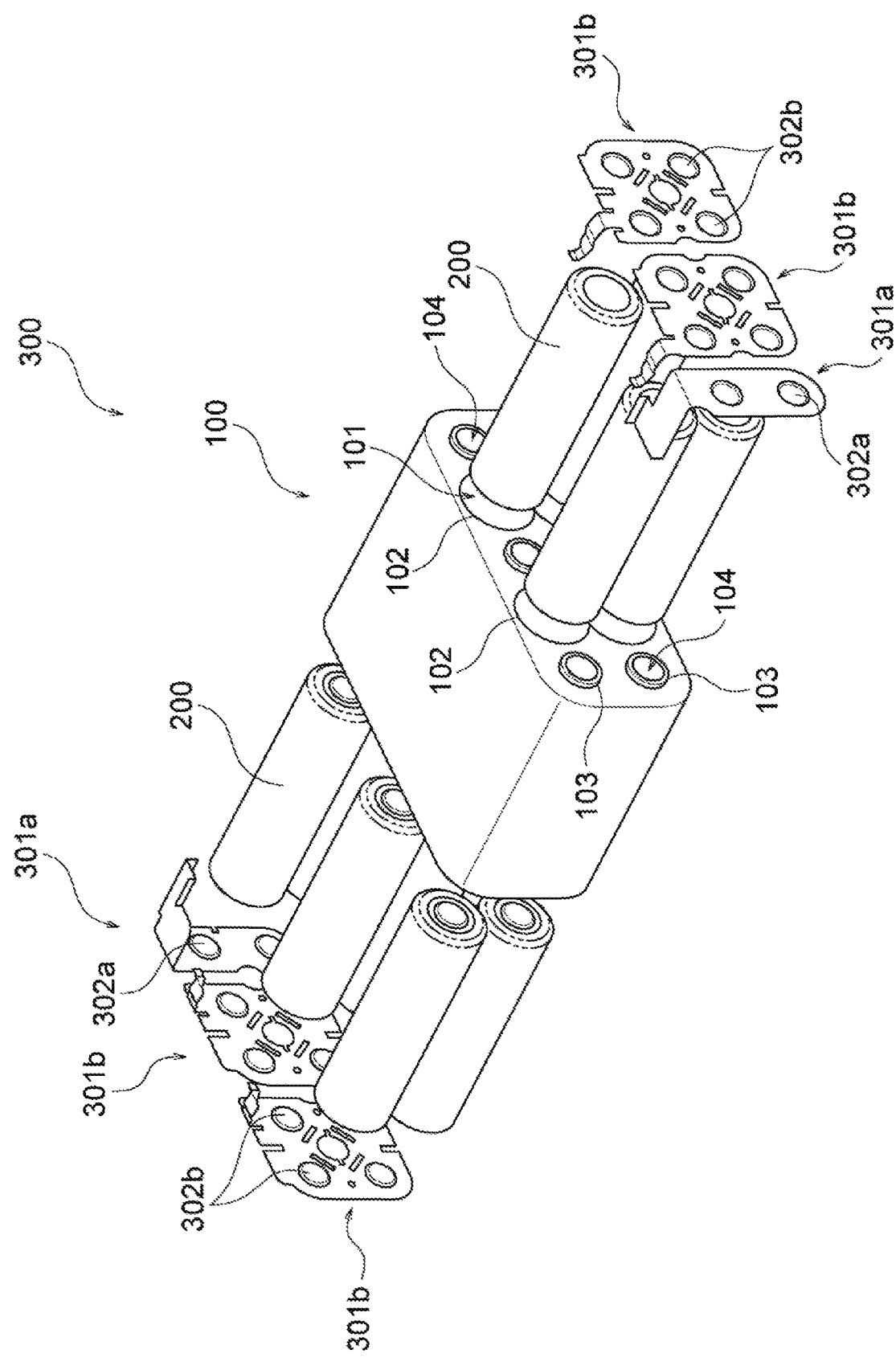
FIG. 3 is an exploded perspective view showing a battery block using the battery holder shown in FIG. 1.

FIG. 3 is an exploded perspective view showing a configuration of a battery block 300 using the battery holder 100. The battery block 300 of the present embodiment includes a plurality of batteries 200, the battery holder 100 for holding the batteries 200, and metal plates 301a and 301b such as lead plates connected to terminals of the batteries 200. In the present embodiment, ten of the batteries 200 are contained in one battery holder 100 in two rows and five columns to constitute a battery group. The battery housing portions 102 are arrayed, as an example, in two rows and five columns, and adjacent batteries in the same row are arranged to alternate the orientations of the positive electrode surface and the negative electrode surface. However, the battery housing portions of the present technology can be arrayed in multiple rows and multiple columns, and at least some of adjacent batteries can be arranged to alternate the orientations of the positive electrode surface and the negative electrode surface.

Specifically, as shown in FIG. 3, in the battery holder 100, right and left adjacent batteries 200 contained in the same row are arrayed to alternate the orientations of the positive electrode surface and the negative electrode surface. On the other hand, in the battery holder 100, upper and lower adjacent batteries 200 in the same row are arrayed to align the orientations of the positive electrode surface and the negative electrode surface in the same direction. In the battery block according to the present technology, the array direction of the batteries 200 shown in FIG. 3 is merely an example, and an array direction employed for a conventional battery block may be employed.

The battery 200 according to the present technology is not particularly limited, and a publicly known battery can be used. Such batteries include primary batteries such as manganese dry batteries, alkaline manganese dry batteries, and lithium primary batteries, and secondary batteries such as nickel-cadmium batteries, nickel metal hydride batteries, nickel-zinc batteries, lead batteries, lithium secondary batteries, lithium ion secondary batteries, and lithium polymer secondary batteries. For the battery pack according to the present technology, it is preferable to use a lithium ion secondary battery (for example, model number US18650 series manufactured by Sony Corporation). Furthermore, the shape of the battery 200 is not limited to a cylindrical shape, and may be another shape such as a square shape. In this case, the shape of the battery housing portion 102 is formed to be able to contain the battery.

In the battery block 300 of the present embodiment, a lithium ion secondary battery having a high energy density is used as the battery 200. For this reason, in the exterior case in which the battery block 300 of the present embodiment is contained, a protection circuit board 504 is contained in order to ensure safety. The number and connection mode of the batteries contained in the battery holder in the battery block according to the present technology can be changed as appropriate in accordance with the configuration and purpose of use of a battery pack using the battery block.

In the battery housing portion 102 of the battery holder 100, when the battery 200 is inserted into the insertion hole 101 of the battery holder 100 from the positive electrode surface, the positive electrode terminal of the battery cell 200 is exposed from the rib hole 104 on the front surface of the battery holder 100. The positive electrode terminal exposed from the rib hole 104 or the negative electrode terminal exposed from the insertion hole 101 of each of the battery storage portions 102 and the terminal contact portions 302a and 302b formed on the metal plates 301a and 301b are joined. These joints are performed, for example, by resistance welding or welding by laser light heating. The metal plate 301a has, for example, a substantially rectangular shape that is elongated vertically, and two of the terminal contact portions 302a are formed in the vertical direction. The metal plate 301b has, for example, a substantially square shape, and four of the terminal contact portions 302b are formed near the corners. These terminal contact portions 302a and 302b are formed, for example, by drawing the metal plates 301a and 301b.

An outline of the joint state of the positive electrode terminal of the battery 200 and the terminal contact portion 302a of the metal plate 301a in the vicinity of the circumferential rib 103 at the left end of the battery holder 100 in FIG. 3 will be described. The positive electrode terminal of the battery 200 contained in the battery storage portion 102 is exposed from the rib hole 104 and joined with the terminal contact portion 302a formed on the metal plate 301a, for example. At this time, a part of the circumferential rib 103 is pinched in a squeezed state by the peripheral portion of the positive electrode terminal and the metal plate 301a around the terminal contact portion 302a.

Figure 4A:
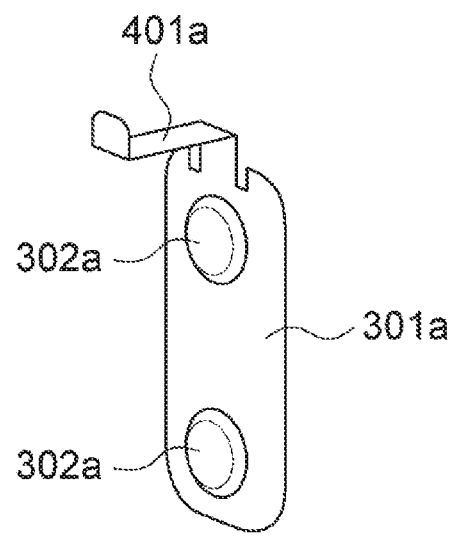

FIG. 4A shows an example of the appearance of the metal plate 301a. The metal plate 301a has, for example, a flat plate shape, and two of the terminal contact portions 302a are formed in the vertical direction. The number of the terminal contact portions 302a formed on the metal plate 301a can be changed as appropriate. The terminal contact portion 302a has a drawn shape formed by drawing the metal plate 301a. The drawn shape makes it possible to easily join the terminal contact portion 302a to the positive electrode terminal of the battery. A bent portion 401a is formed by bending the metal plate extended from the vicinity of the end portion of the metal plate 301a. For example, the tip of the bent portion 401a is joined to the protection circuit board 504 described later.

Figure 4B:
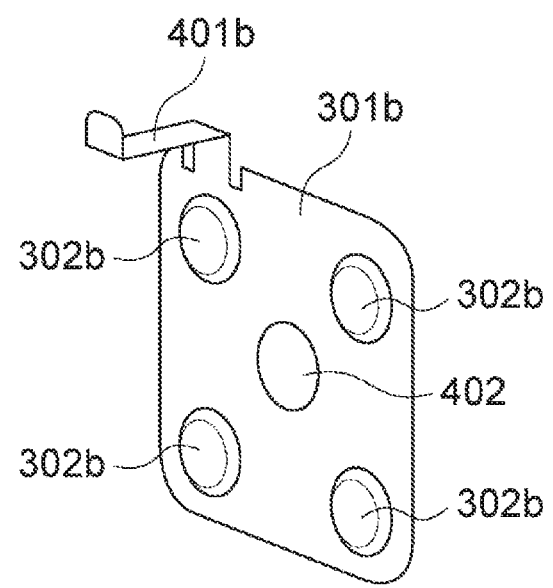

FIG. 4B shows an example of the appearance of the metal plate 301b. The metal plate 301b is, for example, a substantially square flat plate, and four of the terminal contact portions 302b are formed. The terminal contact portion 302b is formed in the vicinity of each corner of the metal plate 301b. The number of the terminal contact portions 302b formed on the metal plate 301b can be changed as appropriate. The terminal contact portion 302b has a drawn shape formed by drawing the metal plate 301b. The drawn shape makes it possible to easily join the terminal contact portion 302b to the positive electrode terminal or the negative electrode terminal of the battery. A bent portion 401b is formed by bending the metal plate extended from the vicinity of the end portion of the metal plate 301b. For example, the tip of the bent portion 401b is joined to the protection circuit board 504 described later. A through hole 402 through which a screw or the like passes is formed substantially at the center of the metal plate 301b.

The metal plates 301a and 301b are preferably composed of, for example, a copper alloy such as nickel or nickel alloy or a material similar to this. This makes it possible to distribute power with low resistance. Furthermore, weldability between the terminal contact portions 302a and 302b formed on the metal plates 301a and 301b and the positive electrode terminal and the negative electrode terminal of the battery 200 becomes improved. The surfaces of the metal plates 301a and 301b may be plated with tin or nickel in order to prevent the surfaces from oxidizing and rusting.

Figure 5:
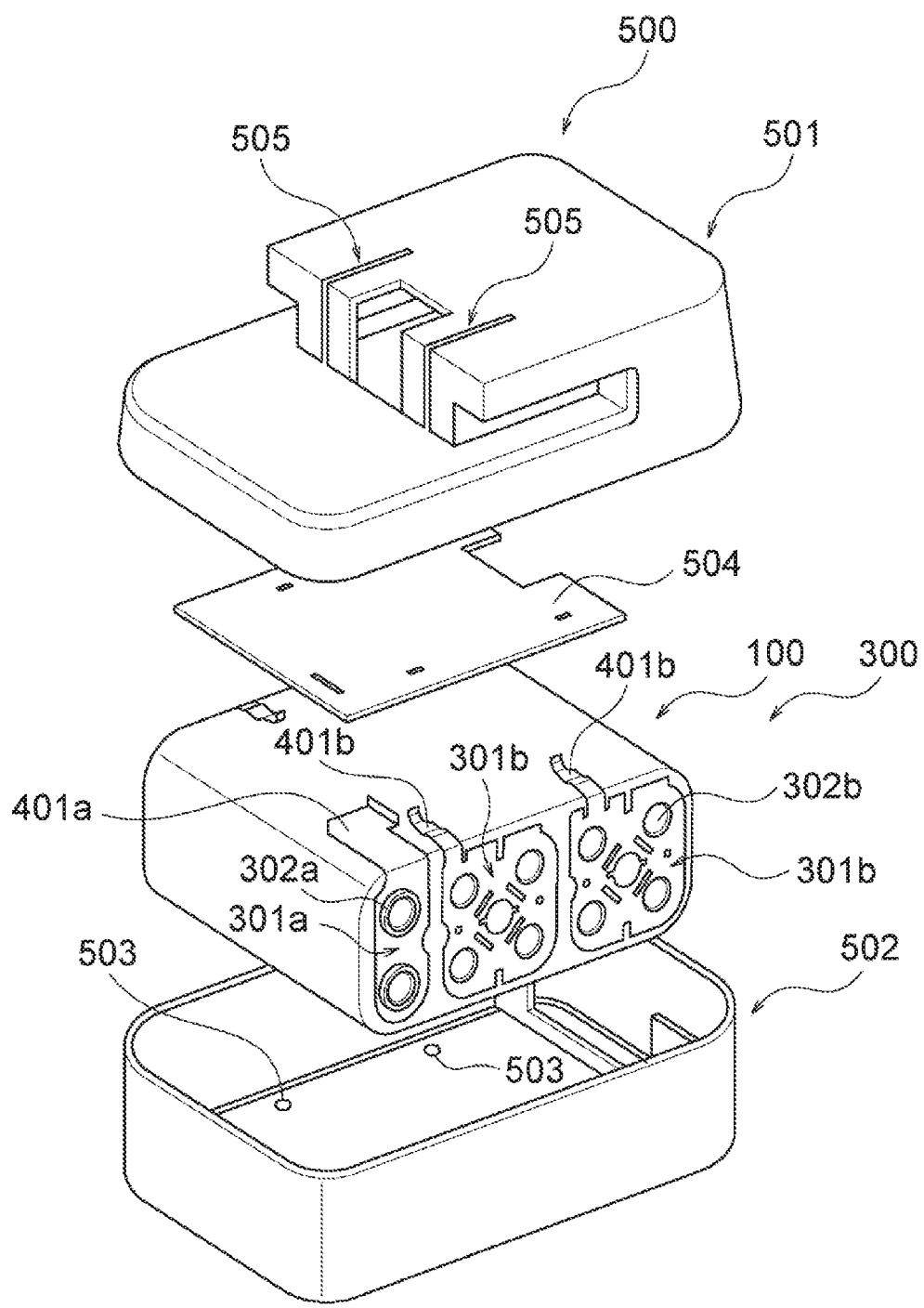
FIG. 5 is an exploded perspective view showing a battery pack according to an embodiment of the present technology.

FIG. 5 is an exploded perspective view showing a battery pack 500 according to the first embodiment of the present technology. As shown in FIG. 5, the battery pack 500 of the present embodiment includes an upper exterior case 501, the battery block 300 using the battery holder 100 containing the battery 200, and a lower exterior case 502 fitted to the upper exterior case 501. On the upper surface of the battery holder 100, the protection circuit board 504 joined by the bent portions 401a and 401b of the metal plates 301a and 301b is disposed.

The upper exterior case 501 and the lower exterior case 502 are formed of a resin, for example. The upper exterior case 501 has a substantially rectangular upper surface plate. In the upper exterior case 501, a side surface plate is erected downward from the periphery of the upper surface plate. The upper exterior case 501 is directly connected to a main body of an electronic device or the like to which the battery pack 500 of the present embodiment is applied. A terminal is provided on the protection circuit board 504 at a position corresponding to a slit 505 in the central portion of the upper exterior case 501. A terminal exposed from an electronic device or the like is inserted into the slit 505 of the upper exterior case 501, and thus the electronic device or the like and the battery pack 500 are connected.

The lower exterior case 502 has a substantially rectangular bottom surface plate. In the lower exterior case 502, a side surface plate is erected upward from the periphery of the bottom surface plate. At the periphery of the bottom surface plate of the lower exterior case 502, a plurality of drainage holes 503 are formed at predetermined intervals. When the battery block 300 using the battery holder 100 is contained in the lower exterior case 502, at least some of the plurality of holder grooves 201 formed in the bottom surface portion 107 of the battery holder 100 are arranged at a position facing the drainage hole 503. This allows water that has entered the battery pack to be easily drained from the drainage hole 503 formed in the lower exterior case 502.

The battery pack 500 of the present embodiment is formed by containing the protection circuit board 504 and the battery block 300 between the upper exterior case 501 and the lower exterior case 502 and combining the upper exterior case 501 and the lower exterior case 502 face to face. In the battery pack 500 shown in FIG. 5, a pair of the upper exterior case 501 and the lower exterior case 502 are combined by fastening a screw (not shown). The method of combining the upper exterior case 501 and the lower exterior case 502 is not particularly limited, and any publicly known method can be used.

The plurality of batteries 200 are fixed by the battery holder 100 and the metal plates 301a and 301b. In this manner, use of the battery holder 100 is capable of reliably insulating between the batteries 200. Furthermore, since the battery 200 is stably fixed to the battery storage portion 102 of the battery holder 100, it is possible to prevent the position of the battery 200 from being shifted due to an external impact.

In the battery holder 100 of FIG. 5, the plurality of batteries 200 are electrically connected via the metal plates 301a and 301b. As shown in FIGS. 3 and 5, in the present embodiment, two of the upper and lower batteries 200 arranged in one column are connected in parallel, and five of the right and left batteries 200 arranged in one row are connected in series. In addition, a predetermined wiring pattern is formed on the protection circuit board 504. The bent portions 401a and 401b of the metal plates 301a and 301b are soldered and connected to predetermined portions of the wiring pattern of the protection circuit board 504, for example.

Figure 6A:
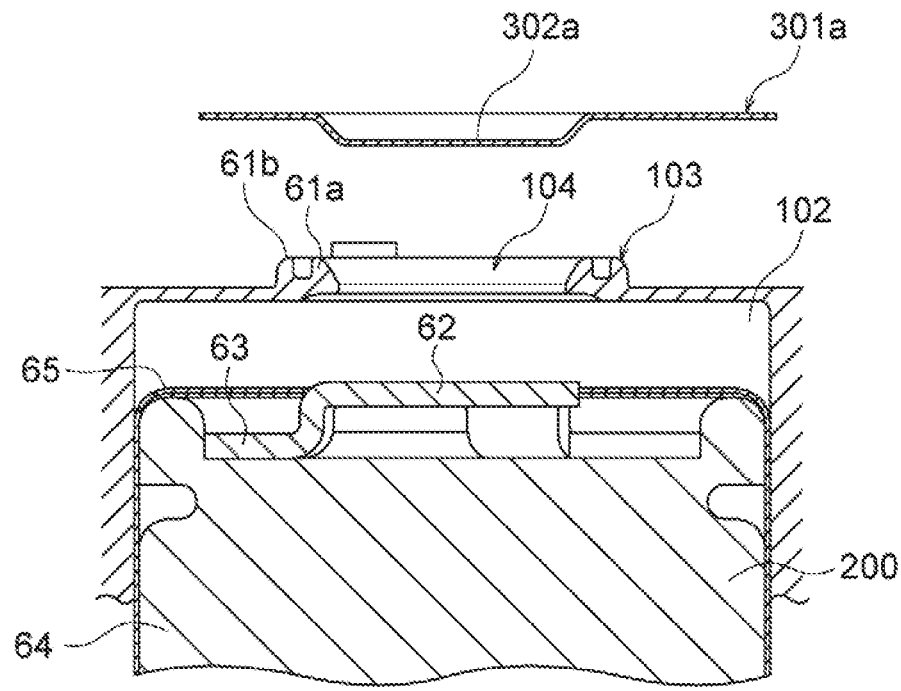
Figure 6B:
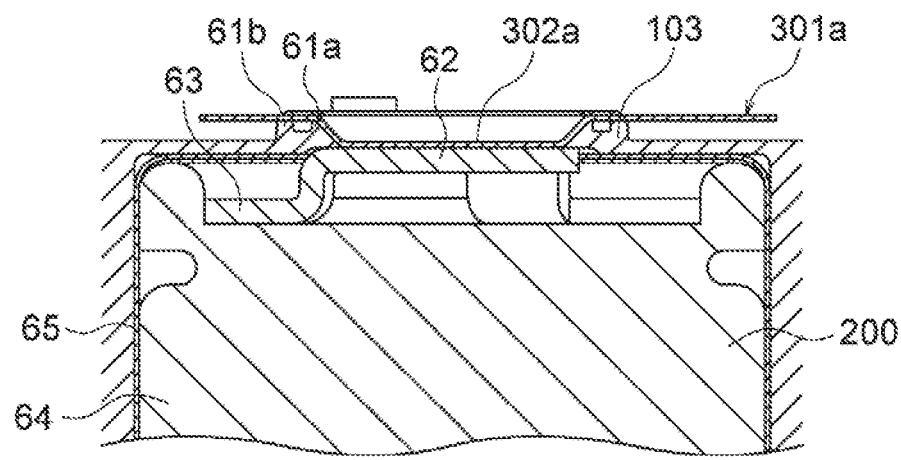

FIGS. 6A and 6B each are an enlarged sectional view showing the connection state of the battery according to the present embodiment and the metal plate. FIG. 6A is an enlarged sectional view showing a state before the battery and the metal plate are connected, and FIG. 6B is an enlarged sectional view showing a state after the battery and the metal plate are connected. In the present embodiment, the circumferential rib 103 formed on the side surface of the battery holder 100 and the metal plates 301a and 301b prevent water from entering the battery holder 100. Hereinafter, as an example, the configuration in which water is prevented from entering using the metal plate 301a will be described.

As shown in FIG. 6A, the positive electrode terminal side of the battery 200 is inserted into the battery storage portion 102. When the battery 200 is contained in the battery storage portion 102, a top cover 62 of the positive electrode terminal is inserted into the rib hole 104 of the battery holder 100, and the substantial center of the top cover 62 is exposed from the rib hole 104. Furthermore, the terminal contact portion 302a of the metal plate 301a is inserted into the rib hole 104 from the outside of the battery holder 100. Then, the terminal contact portion 302a is joined to the exposed portion of the top cover 62. The metal plate 301a around the terminal contact portion 302a having been joined squeezes the vicinity of the portion where a convex portion 61a and a convex portion 61b are formed around the circumferential rib 103, and the peripheral portion of the terminal contact portion 302a is crimped to the circumferential rib 103.

FIG. 6B shows an example of a state in which the terminal contact portion 302a is joined to the top cover 62. Crimping the peripheral portion of the terminal contact portion 302a to the circumferential rib 103 is capable of preventing water from entering the battery holder 100 through the rib hole 104. As a result, it is possible to block a flow path of moisture transmitted through a gap between a battery container 64 and a resin tube 65, and therefore, it is also possible to prevent water from entering from the vicinity of a crimp portion.

Furthermore, the battery holder 100 of the present embodiment can not only improve waterproof property between the battery holder 100 and the exterior case but also improve impact resistance. The battery holder 100 is formed of a material containing an elastic material. Hence, even if an impact is applied due to dropping of the battery pack or the like, the battery holder 100 functions as a shock absorbing material and thus relieves the external impact. As a result, it is not necessary to insert a shock absorbing material or the like into the battery pack with a simple structure, and thus the manufacturing cost can be reduced. Furthermore, since it is formed of a material containing an elastic material, it is also excellent in vibration performance when used for a power tool or the like.

As described above, since elastic members such as rubber are unlikely to change with age, and the peripheral portion of the terminal contact portion 302a is crimped so that the circumferential rib 103 is squeezed, the position of the terminal contact portion 302a does not shift with an external impact. Thus, it is possible to reliably prevent water from entering from the positive electrode terminal side. Furthermore, since the circumferential rib 103 may be formed only on the positive electrode terminal side, the manufacturing cost can be reduced. With the above configuration, the battery pack of the present embodiment can improve waterproof property and anti-vibration property of the battery 200. While in FIGS. 6A and 6B, the connection state between the positive electrode terminal and the terminal contact portion 302a is described, the same is true for the connection state between the positive electrode terminal and the terminal contact portion 302b.

It is possible to reduce the contact area of the circumferential rib 103 of the present embodiment with the peripheral portion of the terminal contact portion 302a by forming the convex portion 61a and the convex portion 61b. As the contact area decreases, the pressure increases. This allows the circumferential rib 103 to be effectively squeezed even if the external pressure is small.

The thicknesses of the convex portion 61a and the convex portion 61b may be made different. Since the peripheral portion of the rib hole 104 is disposed at the end portion of the convex portion 61a, the thickness of the convex portion 61a is smaller than the thickness of the convex portion 61b. Therefore, the convex portion 61a is more prone to be deformed by being squeezed than the convex portion 61b is. The adhesion property with the metal plate 301a is important in a portion where the convex portion 61a is formed. For this reason, the thickness of the convex portion 61a is reduced to facilitate deformation. On the other hand, the convex portion 61b is formed for positioning the metal plate 301a with respect to the battery storage portion 102, for example. Accordingly, the thickness of the convex portion 61b is increased to secure rigidity, and the function of positioning can be obtained.

Forming the convex portion 61a and the convex portion 61b in proximity to each other allows a slight space to be formed between the convex portion 61a and the convex portion 61b. The convex portion 61a and the convex portion 61b are prone to be deformed by using the space as a relief when the convex portion 61a and the convex portion 61b are deformed. Therefore, the circumferential rib 103 can be squeezed with a small pressure.

The top cover 62 and the terminal contact portion 302a may be joined by resistance welding or the like in a state where the metal plate 301a is pressed against the convex portion 61a and the convex portion 61b with a predetermined pressure. As a result, by providing the space for relief of the convex portion 61a and the convex portion 61b, the convex portion 61a and the convex portion 61b can be squeezed with a small pressure, and thus it is possible to prevent joint defect from occurring.

Figure 7:
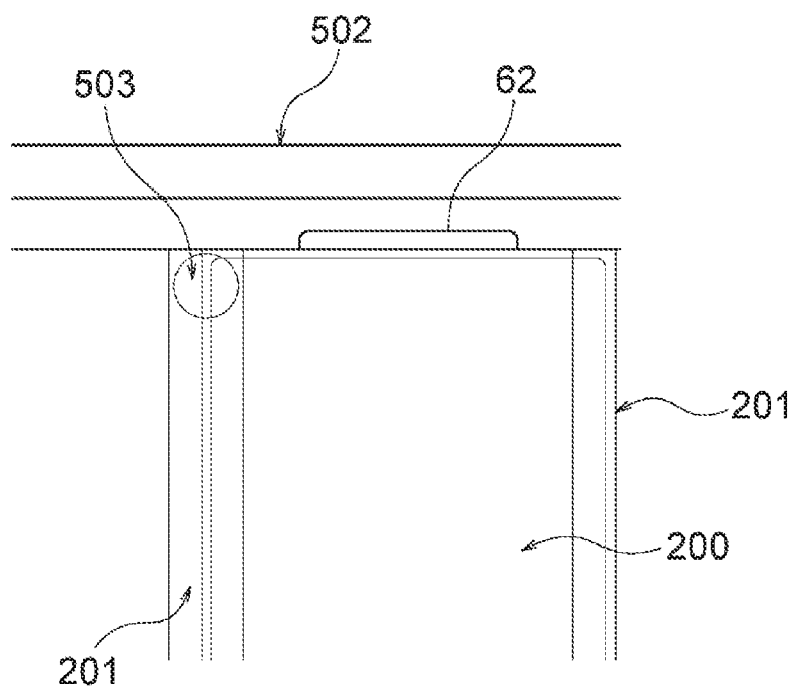
FIG. 7 is a partially enlarged perspective view showing a positional relationship between a holder groove formed in the battery holder shown in FIG. 5 and a lower exterior case.

FIG. 7 is a partially enlarged perspective view showing the positional relationship between the holder groove formed in the battery holder according to the present embodiment and the lower exterior case. FIG. 7 shows a view from the upper surface side of the battery holder 100 toward the bottom surface portion of the lower exterior case 502.

On the bottom surface portion 107 of the battery holder 100 in which the battery 200 is contained, the plurality of holder grooves 201 extending in the direction in which the battery is housed are formed at predetermined intervals. At the periphery of the bottom surface plate of the lower exterior case 502, a plurality of drainage holes 503 are formed at predetermined intervals. In FIG. 7, the holder groove 201 formed in the bottom surface portion 107 of the battery holder 100 contained in the lower exterior case 502 is arranged at a position facing the drainage hole 503.

With this arrangement, when entering the battery pack, water reaches and flows through the holder groove 201 at the bottom surface of the battery holder 100, and the water is guided to the drainage hole 503 arranged at the opposite position to the holder groove 201, thereby allowing the water to be easily drained to the outside of the battery pack. Since the holder groove 201 is formed, the water that having entered one end of the lower exterior case 502 can be guided to the drainage hole 503 even when the battery pack is inclined. Therefore, it is possible to improve the waterproof property of the battery pack according to the present embodiment by forming the holder groove 201 and the drainage hole 503.

With the above configuration, the battery pack according to the present embodiment reduces a temperature difference at the time of charging and discharging with a large current of the plurality of batteries by reducing a rapid temperature rise of the batteries, and hence the battery pack can have thermal diffusivity and anti-vibration property. With the above configuration, the battery pack according to the present embodiment can also have impact resistance and waterproof property.

Next, the second embodiment of the battery pack according to the present technology will be described with reference to FIGS. 8 and 9. In the battery pack according to the present embodiment, protrusion (rib) portions for fixing the battery block 300 to the upper exterior case 801 and the lower exterior case 802 are formed. In the battery pack according to the present embodiment, the lower exterior case 802 has a drainage groove 806 in addition to the drainage hole 503 provided on the periphery of the bottom surface portion of a battery block storage portion 805 in which the battery block 300 is stored. The configuration of the battery pack according to the present embodiment other than that described above is the same as that of the battery pack according to the first embodiment. For this reason, a common configuration is given an identical reference numeral and its description will be omitted.

Figure 8:
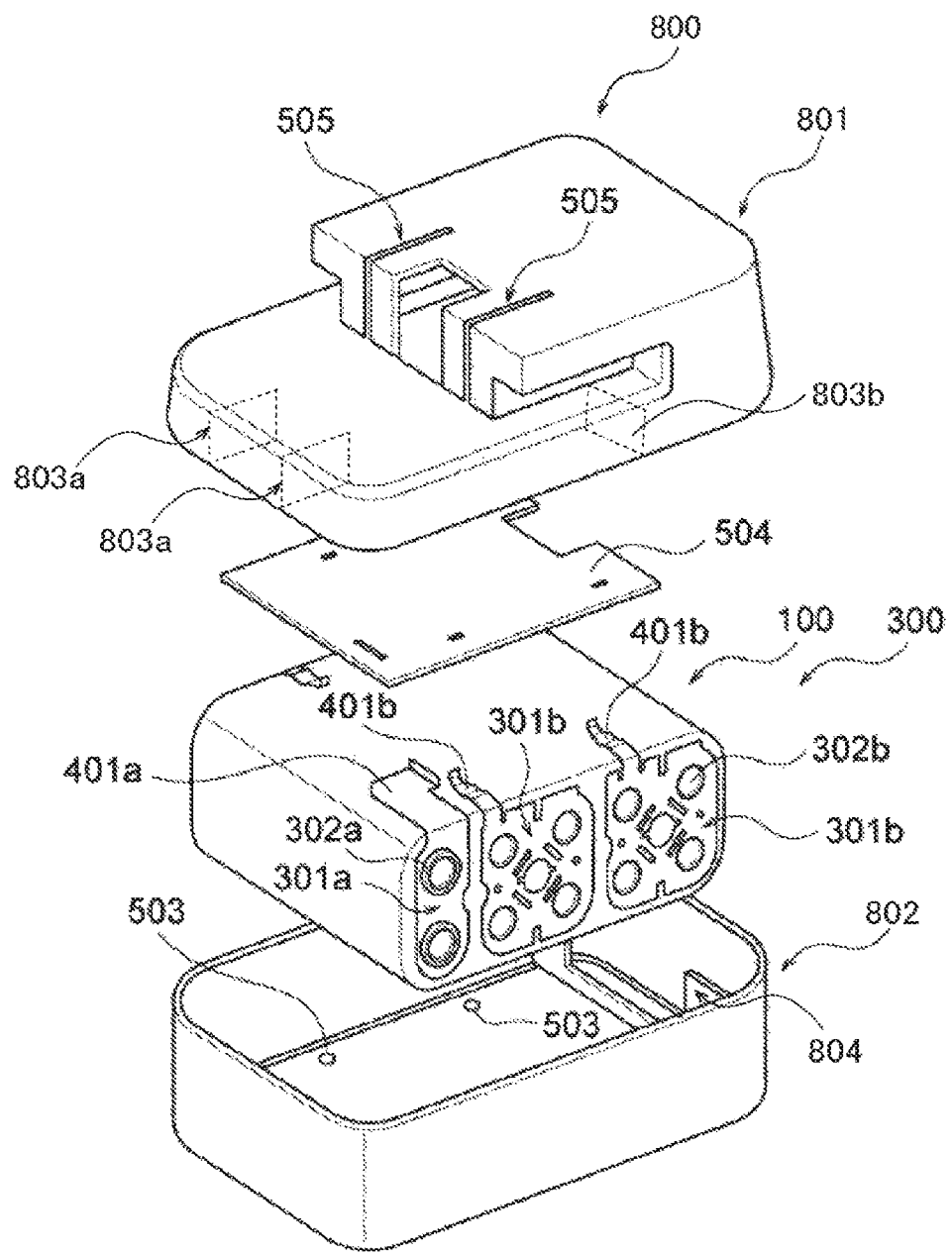
FIG. 8 is an exploded perspective view showing a battery pack according to an embodiment of the present technology.

FIG. 8 is an exploded perspective view showing a battery pack 800 according to the second embodiment of the present technology. As shown in FIG. 8, the battery pack 800 of the present embodiment includes an upper exterior case 801, the battery block 300 using the battery holder 100 containing the battery 200, and a lower exterior case 802 fitted to the upper exterior case 801.

On the inner side of the side surface of the upper exterior case 801, two rectangular protrusion portions 803a in contact with the battery holder 100 are formed substantially in parallel on one short side. On the inner side of the side surface of the upper exterior case 801, a rectangular protrusion portion 803b in contact with the battery holder 100 is formed on each long side at a position opposed to each other. In the present embodiment, the protrusion portions 803a and the protrusion portions 803b are referred to as a first protrusion portion. In the battery pack 800 of the present embodiment, since the protrusion portions 803a and the protrusion portions 803b are formed, it is possible to fix the position of the battery holder 100 and bring the battery holder 100 into close contact with the lower exterior case 802 by pressing the battery holder 100 against the lower exterior case 802 when the battery block 300 is stored in the upper exterior case 801 and the lower exterior case 802. However, the number and arrangement of the protrusion portions 803a and the protrusion portions 803b are not limited to those of the present embodiment, and they may be formed at positions where they bring the battery block 300 into close contact with the upper exterior case 801 and/or the lower exterior case 802 when the battery block 300 is stored in the upper exterior case 801 and the lower exterior case 802.

On the inner side of the side surface of the lower exterior case 802, a rectangular protrusion portion 804 is formed on each long side at a position opposed to each other. In the present embodiment, the protrusion portions 804 are referred to as a second protrusion portion. In the battery pack 800 of the present embodiment, since the protrusion portions 804 are formed, it is possible to fix the position of the battery holder 100 by the side surface of the short side portion of the lower exterior case 802 and the protrusion portions 804 sandwiching the battery block 300 when the battery block 300 is stored in the lower exterior case 802.

Since the battery pack 800 of the present embodiment has the above-described first and second protrusion portions, the battery block 300 is stored in the lower exterior case 802 with the bottom surface of the battery block 300 brought into close contact with the lower exterior case 802. This allows the thermal diffusivity and the anti-vibration property to be further improved.

Figure 9:
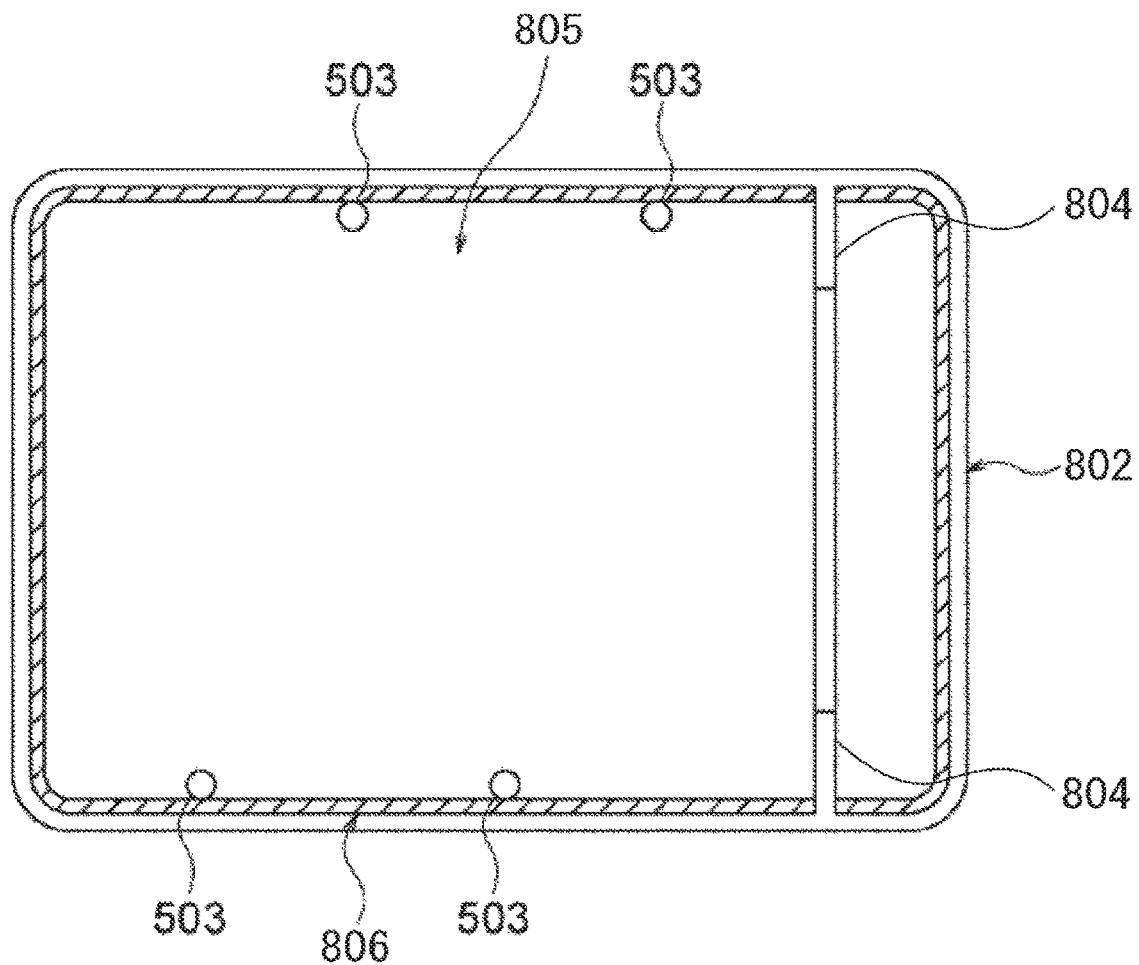
FIG. 9 is a plan view showing a lower exterior case according to an embodiment of the present technology.

FIG. 9 is a plan view showing the lower exterior case 802 of the present embodiment. In the lower exterior case 802 of the present embodiment, the circumferential drainage groove 806 is formed at the periphery of the bottom surface portion. In the battery pack according to the present embodiment, the plurality of holder grooves 201 formed in the bottom surface portion 107 of the battery holder 100 can be arranged at positions where the end portions of at least a part of the holder grooves 201 face the drainage holes 503 and a part of the drainage groove 806. In the present embodiment, the drainage holes 503 are alternately provided on the opposite side surfaces of the lower exterior case 502 in accordance with the intervals of the holder grooves 201, but the position where the drainage holes 503 are arranged is not limited thereto. In the present embodiment, the drainage holes 503 and the drainage groove 806 are provided in contact with each other, but the positional relationship between the drainage holes 503 and the drainage groove 806 is not limited thereto.

With this arrangement, when entering the battery pack, no matter which direction the battery pack is inclined, water reaches and flows through the holder groove 201 at the bottom surface of the battery holder 100, and the water can be guided to the drainage hole 503 and the drainage groove 806 arranged at the opposite position to the holder groove 201, thereby allowing the water to be easily and reliably drained to the outside of the battery pack. Accordingly, with the above configuration, the battery pack of the present embodiment can improve the waterproof property more than the battery pack of the first embodiment.

Note that in the battery pack according to the first embodiment and the battery pack according to the second embodiment, an application example to the cylindrical battery 200 is described, but the present technology is not limited thereto and can be widely applied to modified embodiments such as a battery pack that includes a battery holder that contains a laminate-type battery, for example.

The material of the battery holder according to the present technology may include an elastic material having thermal conductivity. As materials for the battery holder, in addition to the above-mentioned materials, rubber materials such as natural rubber, synthetic natural rubber, silicon, isoprene rubber, butadiene rubber, styrene rubber, styrene butadiene rubber, butyl rubber, ethylene-prolene rubber, nitrile rubber, chlorosulfonated polyethylene rubber, acrylic rubber, urethane rubber, silicone rubber, fluororubber, polysulfide rubber, and thermoplastic elastomer can be used.

An example of the electronic device of the third embodiment according to the present technology includes the battery pack of the first or second embodiment according to the present technology as a power supply source.

The battery pack provided in the electronic device of the third embodiment according to the present technology is as described above, and is the battery pack of the first or second embodiment shown in FIGS. 1 to 9. Accordingly, description of the battery pack is omitted here.

Electronic devices of the third embodiment according to the present technology include a laptop computer, a PDA (personal digital assistant), a mobile phone, a cordless telephone handset, a video movie, a digital still camera, an electronic book, an electronic dictionary, a music player, a radio, a headphone, a game console, a navigation system, a memory card, a pacemaker, a hearing aid, a power tool, an electric shaver, a refrigerator, an air conditioner, a television, a stereo, a water heater, a microwave, a dishwasher, a washing machine, a dryer, a lighting device, a toy, a medical device, a robot, a road conditioner, and a traffic light.

The battery pack of the first and second embodiments according to the present technology can be used to supply electric power to an electric vehicle of the fourth embodiment according to the present technology. An example of the electric vehicle of the fourth embodiment according to the present technology includes the battery pack of the first or second embodiment according to the present technology, a conversion unit (converter) that converts electric power supplied from the battery pack into a driving force, a drive unit (driver) that drives in response to the driving force, and a control unit (controller) that controls a usage state of the battery pack. Electric vehicles include a railway car, a golf cart, an electric cart, and an electric vehicle (including a hybrid vehicle), and the battery pack is used as a driving power source or an auxiliary power source for them.

Figure 10:
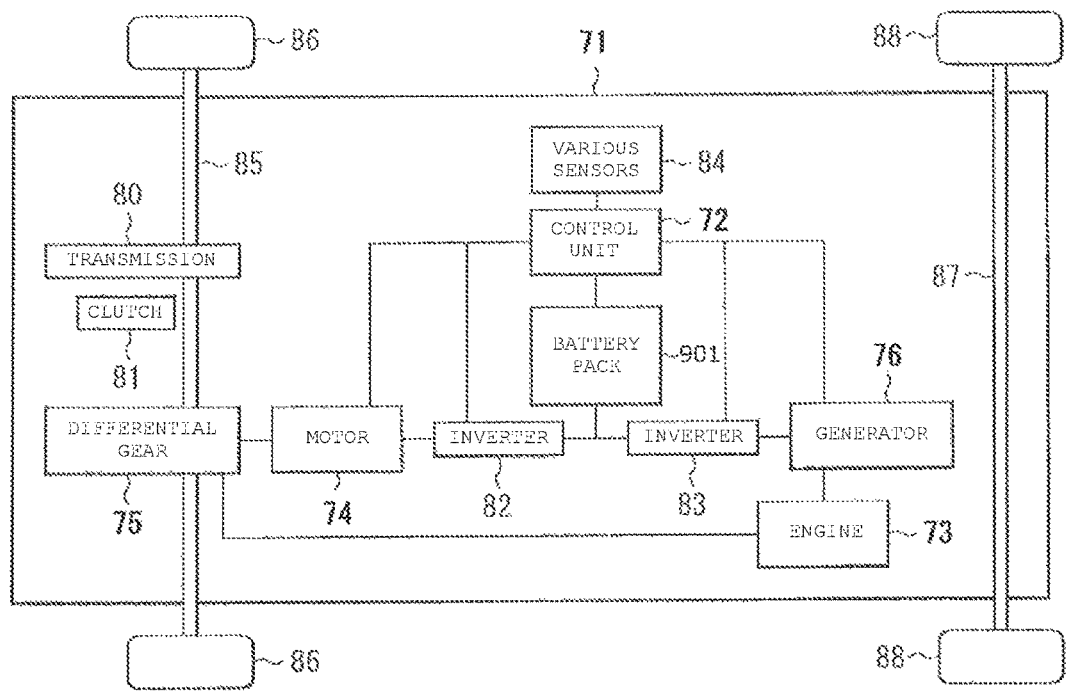
FIG. 10 is a block diagram showing a configuration example of an electric vehicle of an embodiment according to the present technology.

FIG. 10 shows a block configuration of a hybrid vehicle that is an example of the electric vehicle. This electric vehicle includes, in a metal chassis 71 for example, a control unit (controller) 72, an engine 73, a battery pack 901, a driving motor 74, a differential gear 75, a generator 76, a transmission 80, a clutch 81, inverters 82 and 83, and various sensors 84. Other than them, the electric vehicle includes, for example, a front-wheel drive shaft 85, which is connected to the differential gear 75 and the transmission 80, and front wheels 86, as well as a rear-wheel drive shaft 87 and rear wheels 88.

This electric vehicle can travel, for example, using either the engine 73 or the motor 74 as a drive source. The engine 73 is a main power source, such as a gasoline engine. When the engine 73 is used as a power source, the driving force (rotational force) of the engine 73 is transmitted to the front wheels 86 or the rear wheels 88 via, for example, the differential gear 75, which is a drive unit (driver), the transmission 80, and the clutch 81. The rotational force of the engine 73 is also transmitted to the generator 76, and the generator 76 generates alternating-current power using the rotational force, and the alternating-current power is converted into direct-current power via the inverter 83 and stored in the battery pack 901. On the other hand, when the motor 74 which is a conversion unit (converter) is used as a power source, the power (direct-current power) supplied from the battery pack 901 is converted into alternating-current power via the inverter 82, and the motor 74 is driven using the alternating-current power. The driving force (rotational force) converted from the electric power by the motor 74 is transmitted to the front wheels 86 or the rear wheels 88 via, for example, the differential gear 75, which is a drive unit, the transmission 80, and the clutch 81.

It should be understood that it may be configured that when the electric vehicle decelerates via a braking mechanism (not shown), the resistance during deceleration is transmitted to the motor 74 as a rotational force, and the motor 74 generates alternating-current power using the rotational force. It is preferable that the alternating-current power is converted into direct-current power via the inverter 82, and the direct-current regenerative power is stored in the battery pack 901.

The control unit 72, which controls the operation of the entire electric vehicle, includes a CPU or a processor, for example. The battery pack 901 may be connected to an external power source, and may be capable of storing electric power by receiving power supply from the external power source. The various sensors 84 are used to control the engine speed of the engine 73 and to control the opening degree (throttle opening degree) of a throttle valve (not shown). The various sensors 84 include a speed sensor, an acceleration sensor, and an engine speed sensor.

As the battery pack 901, the first or second embodiment shown in FIGS. 1 to 9 can be applied. Therefore, description of the battery pack is omitted here. While the case where the electric vehicle is a hybrid vehicle has been described, the electric vehicle may be a vehicle (electric vehicle) that operates using only the battery pack 901 and the motor 74 without using the engine 73.

The battery pack of the first and second embodiments according to the present technology can also be applied as a storage power source for a power storage system of the fifth embodiment according to the present technology. An example of the power storage system of the fifth embodiment according to the present technology includes the battery pack of the first or second embodiment according to the present technology, one or more electric devices to which power is supplied from the battery pack, and a control unit that controls power supply from the battery pack to the electric device.

Figure 11:
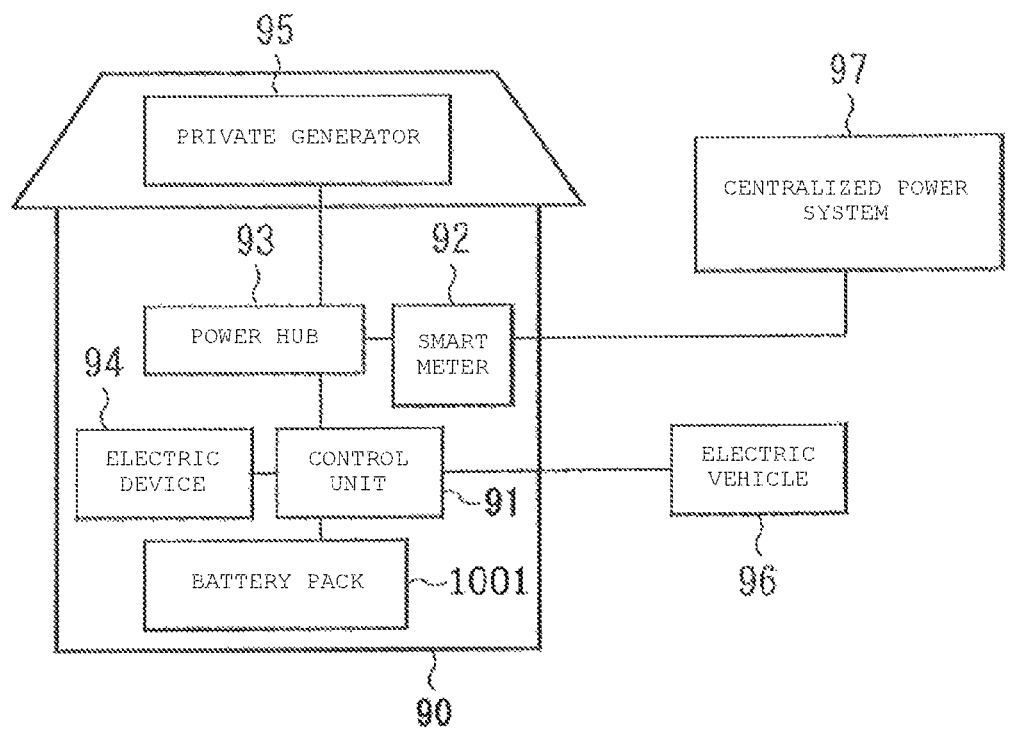
FIG. 11 is a block diagram showing a configuration example of a power storage system according to an embodiment of the present technology.

FIG. 11 shows a block configuration of the power storage system. This power storage system includes, for example, inside a house 90 such as a general house or a commercial building, a battery pack 1001, a control unit 91, a smart meter 92, and a power hub 93.

The battery pack 1001 is connected to, for example, an electric device 94 placed inside the house 90, and can be connected to an electric vehicle 96 stopped outside the house 90. For example, the battery pack 1001 is connected to a private generator 95 placed in the house 90 via the power hub 93, and can be connected to an external centralized power system 97 via the smart meter 92 and the power hub 93. As the battery pack 1001, the battery pack of the first or second embodiment shown in FIGS. 1 to 9 can be applied. Therefore, description of the battery pack is omitted here.

The electric device 94 includes, for example, one or more home appliances, and the home appliances are, for example, a refrigerator, an air conditioner, a television, a water heater, and the like. The private generator 95 is any one type or more types of, for example, a photovoltaic power generator, a wind power generator, and the like. The electric vehicle 96 is one type or more types of, for example, an electric vehicle, an electric motorcycle, a hybrid vehicle, and the like. The centralized power system 97 is one type or more types of, for example, a thermal power plant, a nuclear power plant, a hydroelectric power plant, a wind power plant, and the like.

The control unit 91 (controller), which controls the operation of the entire power storage system (including a usage state of the battery pack 1001), includes a CPU or processor, for example. The smart meter 92 is a network-compatible power meter placed, for example, in the house 90 of the power demander, and can communicate with the power supplier. With this, the smart meter 92 enables an efficient and stable energy supply by controlling the balance of demand and supply in the house 90 while communicating with the outside, for example.

In this power storage system, for example, electric power is stored in the battery pack 1001 from the centralized power system 97, which is an external power source, via the smart meter 92 and the power hub 93, and electric power is stored in the battery pack 1001 from the photovoltaic generator 95, which is an independent power source, via the power hub 93. The electric power stored in the battery pack 1001 is supplied to the electric device 94 and the electric vehicle 96 in response to an instruction from the control unit 91, and hence the electric device 94 becomes operable and the electric vehicle 96 becomes chargeable. That is, the power storage system is a system that enables storage and supply of electric power in the house 90 using the battery pack 1001.

The electric power stored in the battery pack 1001 can be arbitrarily used. Therefore, for example, electric power can be stored in the battery pack 1001 from the centralized power system 97 at midnight when the electric power rate is low, and the electric power stored in the battery pack 1001 can be used during the daytime when the electric power rate is high.

The above-mentioned power storage system may be installed for every house (one household) and may be installed for every two or more houses (a plurality of households).

The battery pack of the first and second embodiments according to the present technology can be applied as a power source for a power tool of the sixth embodiment according to the present technology. An example of the power tool of the sixth embodiment according to the present technology includes the battery pack of the first or second embodiment according to the present technology and a movable portion to which electric power is supplied from the battery pack. The power tools include a power drill, a power saw, a rolling compactor such as a rammer, and a power agricultural implement such as a lawn mower.

Figure 12:
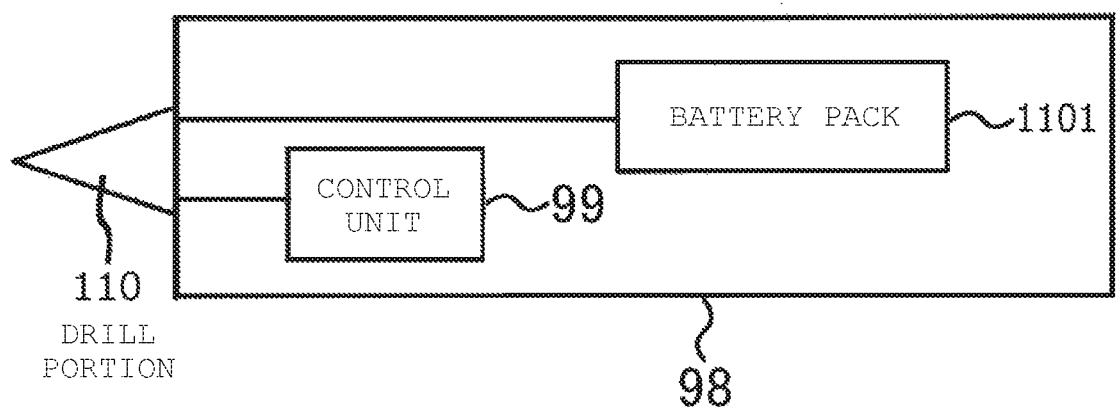
FIG. 12 is a block diagram showing a configuration example of a power tool according to an embodiment of the present technology.

FIG. 12 shows a block configuration of the power tool. This power tool is, for example, a power drill, and includes a control unit 99 and a battery pack 1101 inside a tool body 98 formed of a plastic material or the like. For example, a drill portion 110 which is a movable portion is attached operably (rotatably) to the tool body 98.

The control unit 99 (controller), which controls the operation of the entire power tool (including a usage state of a power source 1101), includes a CPU or processor, for example. The control unit 99 supplies electric power from the battery pack 1101 to the drill portion 110 in response to the operation of an operation switch (not shown).

As the battery pack 1101, the battery pack of the first or second embodiment shown in FIGS. 1 to 9 can be applied. Therefore, description of the battery pack is omitted here.

The present technology is described below in further detail according to an embodiment.

(1)

A battery pack, including:

a plurality of batteries; and a battery holder having a plurality of battery housing portions for storing the batteries, wherein the battery holder is formed of a material including an elastic material having thermal conductivity.

(2)

The battery pack according to (1), wherein the elastic material is rubber or thermoplastic elastomer.

(3)

The battery pack according to (1) or (2), wherein the battery holder is formed of a material including an electrically insulating material.

(4)

The battery pack according to (3), wherein the battery housing portions are arrayed in multiple rows and multiple columns, and at least some of adjacent batteries are arranged to alternate orientations of a positive electrode surface and a negative electrode surface.

(5)

The battery pack according to any one of (1) to (4), further including a metal plate that is joined to the battery holder and has a contact member coming into contact with a terminal of each of the batteries, wherein each of the battery housing portions has an insertion portion into which the battery is inserted, and an opening portion for bringing a terminal of the contained battery and the contact member into contact with each other, and the contact member is formed in a drawn shape, and a circumferential rib that is crimped to a peripheral portion of the contact member is formed around the opening portion.

(6) The battery pack according to any one of (1) to (5), further including
an exterior case for storing the battery holder,
wherein a drainage hole is formed at a periphery of a bottom surface portion of the exterior case.

(7) The battery pack according to (6), wherein a plurality of grooves are formed on a surface of the battery holder that comes into contact with an inside of a bottom surface portion of the exterior case.

(8) The battery pack according to (7), wherein at least some of the plurality of grooves are formed at positions facing the drainage hole.

(9) The battery pack according to any one of (1) to (5), further including
an exterior case for storing the battery holder,
wherein a circumferential drainage groove is formed on a periphery of a bottom surface portion of the exterior case.

(10) The battery pack according to (9), wherein a plurality of grooves are formed on a surface of the battery holder that comes into contact with an inside of a bottom surface portion of the exterior case.

(11) The battery pack according to (10), wherein at least some of the plurality of grooves are formed at positions facing the circumferential drainage groove.

(12) The battery pack according to any one of (1) to (5), further including
an exterior case for storing the battery holder,
wherein an inside of the exterior case has a protrusion portion that is in contact with the battery holder.

(13) The battery pack according to (12), wherein
the exterior case is formed of an upper exterior case and a lower exterior case that is fitted to the upper exterior case, and
a first protrusion portion and a second protrusion portion that are in contact with the battery holder are provided inside the upper exterior case and the lower exterior case, respectively.

(14) An electronic device, including the battery pack according to any one of (1) to (13) as an electric power supply source.

(15) A vehicle, including:
the battery pack according to any one of (1) to (13);
a conversion unit that converts electric power supplied from the battery pack into driving force;
a drive unit that is driven in response to the driving force; and
a control unit that controls a usage state of the battery pack.

(16) A power tool, including:
the battery pack according to any one of (1) to (13); and
a movable portion to which electric power is supplied from the battery pack.

(17) A power storage system, including:
the battery pack according to any one of (1) to (13);
one or more electric devices to which electric power is supplied from the battery pack; and
a control unit that controls power supply from the battery pack to the electric device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A battery pack, comprising:
a plurality of batteries; and
a battery holder including a side further including a first surface and a second surface opposite the first surface and having a plurality of battery housing portions configured to store the batteries, wherein, on the first and second surfaces, each of the battery housing portions includes an insertion hole for inserting the batteries into the battery holder,
wherein the battery holder includes an elastic material having thermal conductivity,
wherein, on the first and second surfaces, the battery holder further includes a plurality of opening portions configured to accept a terminal of the batteries, and a circumferential rib around each of the opening portions,
wherein the battery holder includes an electrically insulating material,
wherein the battery housing portions are arrayed in multiple rows and multiple columns, and at least some of adjacent batteries are arranged to alternate orientations of a positive electrode surface and a negative electrode surface, and
wherein a diameter of the opening portions is less than a diameter of the insertion portion of each of the battery housing portions.

2. The battery pack according to claim 1, wherein the elastic material includes rubber or thermoplastic elastomer.

3. The battery pack according to claim 1, further comprising
a metal plate configured to be joined to the battery holder and has a contact member configured to contact with the terminal of each of the batteries,
wherein
the contact member has a drawn shape configured to allow the circumferential rib to be crimped to a peripheral portion of the contact member.

4. The battery pack according to claim 1, further comprising
an exterior case configured to store the battery holder,
wherein a drainage hole is provided at a periphery of a bottom surface portion of the exterior case.

5. The battery pack according to claim 4, wherein a plurality of grooves are provided on a surface of the battery holder that comes into contact with an inside of a bottom surface portion of the exterior case.

6. The battery pack according to claim 5, wherein at least one of the plurality of grooves is provided at a position facing the drainage hole.

7. The battery pack according to claim 1, further comprising an exterior case configured to store the battery holder, wherein a circumferential drainage groove is provided on a periphery of a bottom surface portion of the exterior case.

8. The battery pack according to claim 7, wherein a plurality of grooves are provided on a surface of the battery holder that comes into contact with an inside of a bottom surface portion of the exterior case.

9. The battery pack according to claim 8, wherein at least one of the plurality of grooves is provided at a position facing the circumferential drainage groove.

10. The battery pack according to claim 1, further comprising an exterior case configured to store the battery holder, wherein an inside of the exterior case has a protrusion portion that is in contact with the battery holder.

11. The battery pack according to claim 10, wherein the exterior case includes an upper exterior case and a lower exterior case that is fitted to the upper exterior case, and a first protrusion portion and a second protrusion portion that are in contact with the battery holder are provided inside the upper exterior case and the lower exterior case, respectively.

12. An electronic device, comprising the battery pack according to claim 1 as an electric power supply source.

13. A vehicle, comprising:

the battery pack according to claim 1;

a converter configured to convert electric power supplied from the battery pack into driving force;

a driver configured to be driven in response to the driving force; and a controller configured to control a usage state of the battery pack.

14. A power tool, comprising:

the battery pack according to claim 1; and a movable portion to which electric power is configured to be supplied from the battery pack.

15. A power storage system, comprising:

the battery pack according to claim 1;

one or more electric devices to which electric power is configured to be supplied from the battery pack; and a controller configured to control power supply from the battery pack to the electric device.

* * * * *